United States Patent Office 2,868,742
Patented Jan. 13, 1959

2,868,742

CORROSIVE RESISTANT POLYETHYLENE EMULSIONS

Robert R. Burnham, Eggertsville, N. Y., assignor to Union Carbide Corporation, a corporation of New York No Drawing. Application April 16, 1956
Serial No. 578,201

2 Claims. (Cl. 260—17)

This invention relates to corrosive resistants, and more particularly to compositions of matter readily dispersible in water, for application to fibrous materials to protect them against the damaging chemical effects of acids and alkalies.

The invention is of particular advantage for treating protective clothing of workmen handling acidic or basic materials which are normally severely harmful to such clothing. When the invention is applied thereto, preferably as an adjunct to laundering, the life of such clothing is enormously increased.

It is the purpose of the present invention to provide a composition of matter comprising an emulsion or dispersion, the active ingredients of which function as repellents to water borne materials, and more specifically to acidic or basic reagents, thus providing protection to the applied fabric and to the wearer of fabrics treated with said emulsion, against the injurious effects of said reagents.

There are many and varied types of materials available which function as repellents to aqueous solutions, such materials being commonly designated as water repellents. These materials are usually constituted as aqueous dispersions or emulsions of aluminum acetate and waxes. Other salts such as aluminum formate, zirconium acetate, zirconium oxychloride, zirconyl ammonium carbonate in conjunction with other waxy or paraffinic materials such as paraffin wax, carnauba, candellia, ouricuri, japan wax, and others too numerous to mention usually function as the effective water repelling agents.

The present invention treats of a composition in emulsified form of polyethylene, chlorinated naphthalene in addition to paraffin wax dispersed in an oil such as xylene or naphtha or a combination of the two, as the oil phase, and a water solution of aluminum acetate as the continuous phase, with hydroxy ethyl cellulose as the emulsifier.

When the resulting emulsion is diluted with water and applied to a fabric in the conventional manner, followed by drying, the resulting fabric is characterized by a high degree of repellency to concentrated acids and alkalies. As an example of when concentrated sulfuric acid, sp. gr. 1.84 is dropped from a height of 6 in. onto a piece of cotton denim treated with the described material, said material is protected from acid penetration for periods up to 3 hours.

The advantages resulting from the use of such a material are obviously many, especially when viewed from an industrial application where large quantities of acids and alkalies are in constant daily use.

Thus, a worker wearing coveralls treated with my invention may be fairly safe from the harmful effects which would normally result from bodily contact from such injurious reagents. The life range of treated coveralls, which have been constantly exposed to acidic or basic materials normally severely harmful to such work clothes, has been immeasurably extended, a fact of considerable importance to the owner of the treated clothes.

The composition according to the present invention comprises an emulsion having an oil phase containing essentially polyethylene or its equivalent, and an aqueous phase containing essentially aluminum acetate or its equivalent, preferably in conjunction with one or more various added waxes, emulsifiers, stabilizers, solvents, diluents or humectants.

The equivalents of polyethylene are polymeric resins such as copolymers of vinyl chloride and vinyl acetate, which are first dissolved in a solvent such as methyl isobutyl ketone.

The oil phase, in addition to the polyethylene or the like as an acid and alkali resistant, may include chlorinated naphthalene which is also acid an alkali resistant, various waxes such as paraffin as water repellents in the oil phase, a solvent for the polyethylene such as xylene, a diluent for the oil phase such as naphtha or kerosene, and an emulsion stabilizer and water repellent such as aluminum di stearate or its equivalent.

The equivalents of aluminum di stearate are oil soluble salts of long chain fatty acids containing 10 to 18 carbon atoms and having a metallic radical of the group consisting of aluminum and zirconyl.

The aqueous phase, in addition to the aluminum acetate or its equivalents, preferably also includes a water soluble emulsifier in the nature of a hydrophylic colloid which is not readily attacked by acidic and basic reagents, and also a humectant, and a dispersing agent.

In the aqueous phase, the equivalents of the aluminum acetate are water soluble dissociable salts of an acid of the group consisting of lower fatty acids containing 2 to 4 carbon atoms, ammonium substituted carbonic acid, and hydrochloric acid, and having a metallic radical of the group consisting of aluminum and zirconyl. While pure basic aluminum acetate is insoluble in water, mixed aluminum salts of acetic and other acids show a considerable degree of solubility, and by incorporating a sufficient amount of from 10 to 15% boric acid or about 30% of formic acid the aluminum salt is made soluble in water and as such may be used in this particular type of formulation. Other compounds may be used instead of the aluminum acetate, such as zirconyl acetate, zirconyl ammonium carbonate, zirconyl oxychloride, aluminum formate, metal propionates and metallic butyrates.

In the aqueous phase, the water soluble emulsifier is hydroxy ethyl cellulose. This ingredient is a bonding and insolubilizing agent which increases the resistance to contact wetting or penetration. Polyvinyl alcohol is not an equivalent of the hydroxy ethyl cellulose, because polyvinyl alcohol requires a plasticizer such as ethanol acetamide, glycerol or diethylene glycol. This plasticizer as well as the humectant can be omitted when hydroxy ethyl cellulose is used instead of the polyvinyl alcohol. Furthermore, a smaller proportion, as low as two parts of hydroxy ethyl cellulose may be used instead of the larger proportion of 3 to 5 parts of polyvinyl alcohol Also the hydroxy ethyl cellulose has the advantage of being free of the gelling characteristics of polyvinyl alcohol, has greater compatibility with salts, greater stability in presence of flame proofing agents such as borates and boric acid, greater resistance to alkali degradation more effective stabilization and hence requiring less material for the same surfactant concentration, improved water resistance by virtue of using less stabilizer, and greater aid in soil removal when applied in last rinse o laundry operation.

The humectant or hygroscopic agent in the aqueous phase comprises an organic polyol compound having from 2 to 6 hydroxyl groups, for example, sorbitol, diethylene glycol, dipropylene glycol, and solid polyethylene glycols having molecular weights from 1000 to 6000. This ingredient serves as a conditioner for the emulsion.

The aqueous phase emulsifying agent is sodium 2-ethylhexyl sulfate or sodium laural sulfate.

The preferred embodiments of the composition are as follows:

|  | Parts | Range |
|---|---|---|
| Paraffin Wax | 12.5 | 5.0–17.0 |
| Polyethylene | 6.0 | 4.8–7.5 |
| Mineral Spirits | 12.5 | 9.0–15.0 |
| Aluminum di stearate | 0.25 | 0.15–0.35 |
| Water | 55.3 | 50.0–60.8 |
| Hydroxy Ethyl Cellulose | 2.0 | 1.7–2.3 |
| Dispersing Agent | 5.2 | 3.9–6.5 |
| Aluminum Acetate | 6.25 | 4.5–8.0 |

An exemplary method of preparation will be recited.

A melt is made of the paraffin wax, polyethylene, mineral spirits and aluminum di stearate at 95–100° C., such that the polyethylene is in the molten state and thoroughly dispersed throughout the oil phase.

The emulsification kettle is filled with the required amount of water, the agitator turned on, followed by the addition of the emulsifying agent, hydroxy ethyl cellulose, and aluminum acetate, agitating until a smooth, homogeneous dispersion is formed.

The temperature of the water phase is raised to 65° C. via steam supplied to the jacketed kettle, at which time the oil phase is added accompanied by vigorous agitation. The agitation is continued for approximately ten minutes.

Prior to reducing the stirring rate, an amount of water equivalent to ten percent by weight of the batch size is added to compensate for water lost during manufacture.

The stirring is then reduced and the emulsion cooled via cold water to the jacket, the stirring being continued at a reduced rate until the formulation attains room temperature.

For use, the emulsion is diluted with water, preferably about 8 parts water to one of emulsion, determined by the dry pick-up desired, preferably about 3% on the weight of the fabric. The optimum temperature is 140° F. with a range of from 85° to 160° F.

The fabrics are immersed in the above water dispersion for periods ranging from 3 to 15 minutes. Then the fabric is extracted, by centrifuging or wringing, mechanically or by hand, allowing for about 75% to 80% wet pick-up. The extracted fabric may be dried at temperatures from 180° F. to 220° F., by tumbling, pressing or running it through a mangle. Satisfactory results may also be obtained on a grid head press.

Functions of constituent parts

Paraffin wax—the aqueous repelling agent in the oil phase.

Polyethylene DYGT—an acid resistant component of the oil phase.

Chlorinated naphthalene—functions similar to polyethylene.

Xylene—solvent for polyethylene.

Naphtha—diluent for oil phase.

Aluminum di-stearate—emulsion stabilizer and aqueous repelling agent.

Water—continuous phase of emulsion.

Hydroxyl ethyl cellulose—water soluble stabilizer functioning in the nature of a hydrophylic protective colloid.

Sodium laural sulfate or sodium 2-ethylhexyl sulfate—aqueous phase emulsifying agent or surface tension depressant.

Aluminum acetate—the aqueous repelling agent in the aqueous phase.

This application is in part a continuation of my copending application Serial No. 299,919, filed July 19, 1952.

I claim:

1. Corrosive resistant comprising an emulsion having an oil phase containing 4.8 to 7.5 parts of polyethylene, 0.15 to 0.35 parts of an emulsion stabilizer and water repellent comprising an oil soluble salt of a long chain fatty acid containing 10 to 18 carbon atoms, and having a metallic radical of the group consisting of aluminum and zirconyl, a solvent for the polyethylene in the oil phase, and wax; an aqueous phase containing 4.5 to 8.0 parts of a water soluble dissociable salt of the group consisting of lower fatty acids containing 2 to 4 carbon atoms, ammonium substituted carbonic acid and hydrochloric acid, said acids having a metallic radical of the group consisting of aluminum and zirconyl, 1.7 to 2.3 parts of an emulsifying agent consisting of hydroxy ethyl cellulose, and 3.9 to 6.5 parts of a dispersing agent for the hydroxy ethyl cellulose selected from the group consisting of sodium 2-ethylhexyl sulfate and sodium lauryl sulfate.

2. Corrosive resistant comprising an emulsion having an oil phase containing from 4.8 to 7.5 parts of polyethylene, from 9.0 to 15.0 parts of a solvent for the polyethylene in the oil phase, said solvent consisting of xylene, and from 5.0 to 17.0 parts of wax; an aqueous phase containing from 4.5 to 8.0 parts of aluminum acetate, and an emulsifying agent consisting of from 1.7 to 2.3 parts of hydroxy ethyl cellulose.

References Cited in the file of this patent

UNITED STATES PATENTS

| 2,343,095 | Smith | Feb. 29, 1944 |
| 2,422,646 | Stark et al. | June 17, 1947 |
| 2,662,866 | Bristol et al. | Dec. 15, 1953 |
| 2,737,458 | Burnham | Mar. 6, 1956 |